June 8, 1965  R. W. SHAW, JR  3,187,929
UNITARY QUICK-OPENING CLOSURE DEVICE
Filed Dec. 6, 1962
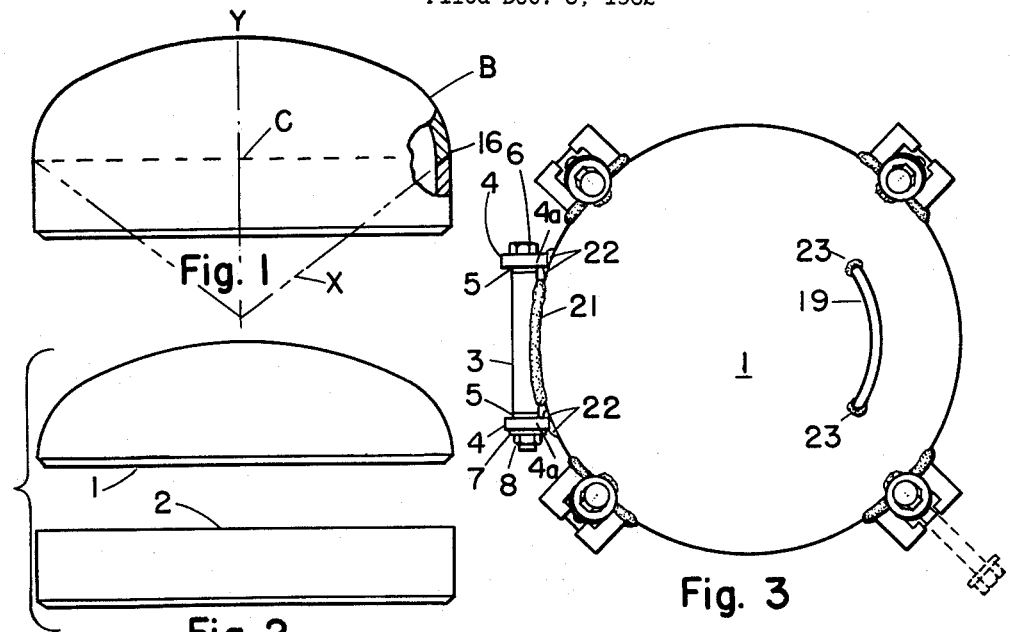
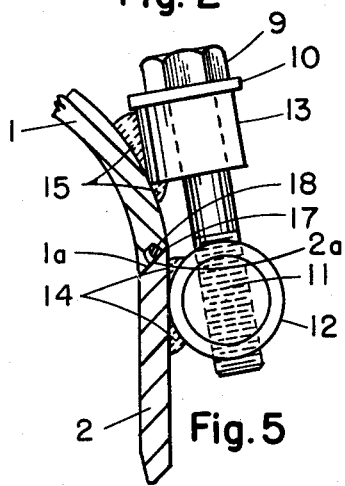
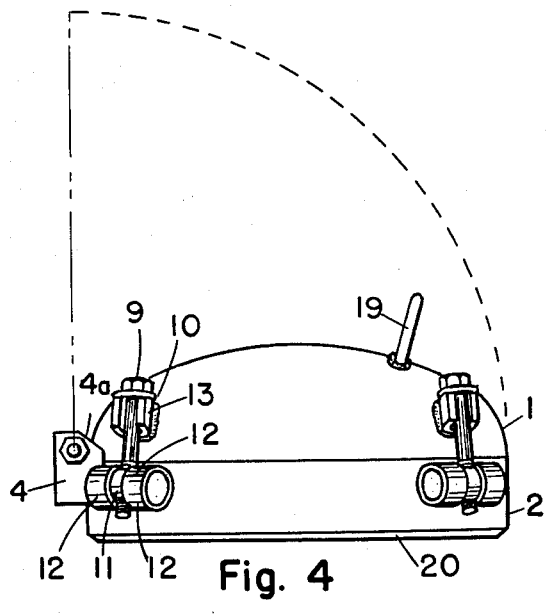
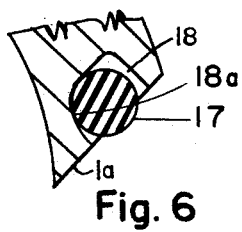
INVENTOR
Robert W. Shaw, Jr.
BY Charles F. Campbell
ATTORNEY

United States Patent Office 3,187,929
Patented June 8, 1965

3,187,929
UNITARY QUICK-OPENING CLOSURE DEVICE
Robert W. Shaw, Jr., Louisville, Ky., assignor to Chemetron Corporation, Chicago, Ill., a corporation of Delaware
Filed Dec. 6, 1962, Ser. No. 242,769
7 Claims. (Cl. 220—46)

The present invention relates to closure devices and more particularly to an improved form of unitary quick-opening closure device adapted to be attached to a tank, vessel, pipe or other fluid containing enclosure in a manner to provide a sealed closure for an opening therein, and also to an improved method of fabricating such unitary closure device.

Various kinds of closure devices are widely employed for closing or blanking-off access openings, manways, inspection ports, handholes and other openings in storage tanks, mixing vessels, separators, filters, towers, reactors and other forms of fluid processing equipment, tank trucks, the ends of pipe lines, and numerous other types of enclosures for fluids, many of which are operated under considerable internal pressure or, in some cases, vacuum. While it is important that such closure devices be capable of effectively sealing the associated opening under the imposed operating conditions of pressure or vacuum, it frequently is desired that they be adapted for ready removal or opening to afford access to the fluid enclosure.

Probably the most common and widely employed closure devices for such purposes are so-called blind flanges or blanking flanges which are bolted to cooperating flanged elements affixed to the walls of the fluid enclosures. In many cases, however, such flange arrangements have pronounced disadvantages and drawbacks, some of which will be pointed out more particularly hereinafter. Among the disadvantages is that they are not adapted to quick opening since they are secured in place by a large number of bolts which require considerable, often excessive, time for removal and replacement.

For situations where ready access to an enclosure opening is important, there have been proposed and used to considerable extent various forms of so-called quick-opening closure devices which, instead of bolts such as required in blind flange closure arrangements, employ clamping rings, bayonet-type or split locking rings, swing bolts and various other types of fastening means to hold a closure head or cap in closed position and which are capable, to varying degrees, of being relatively quickly released for removal or other opening of the head or cap. Such quick-opening closure devices as heretofore available, however, generally have been of relatively complex, and therefore costly, construction. Although justifiable in situations involving high pressure or other special or critical conditions, it frequently is found that by reason of unnecessarily high capacity, complexity or excessive weight of construction, or high cost, and sometimes all of those reasons, it is not practical or economical to employ the heretofore available types of quick-opening closure devices in many situations, particularly where relatively non-critical conditions are present. Often, in such last mentioned situations, it has been necessary, or at least expedient, to resort to conventional bolted blind or blocking flange arrangements with resultant sacrifice of the advantageous quick-opening facility.

A great need, therefore, has been felt for a closure device which in itself does not employ bolted flanges and may be easily and economically applied as a unit to an opening in a fluid enclosure without the necessity for such flanges, which is of simple and low cost construction so as to be suitable for economical non-critical as well as critical installations, and which is capable of sealing the associated opening as effectively as, or even more effectively than, conventional blind flange arrangements and good quick-opening closure devices of the type heretofore available, while employing very simple fastening means which may be released quickly and easily without danger to an operator.

An important object of the present invention is to provide an improved closure device having the advantageous features above recited as well as others that will be set forth in the ensuing description. A further important object is to provide an improved method of fabricating such closure device.

In brief, a closure device according to the present invention is designed to be made available as a factory-assembled unit consisting of a simple form of mounting hub adapted at one end to be attached, preferably by welding, to the wall of a tank, vessel, pipe end or other enclosure for fluids in surrounding relation to an opening therein, a simple form of dished cover mounted on the hub for movement into and out of closing relation to the other end of the hub, and simple, quick-releasable fastening means, preferably in the form of swing bolts, for effecting and maintaining a tight seal between the cover and hub. Further, the cooperating ends of the cover and hub are carefully beveled, in a manner that will be described in detail, so as to provide complementary inclined mating surfaces that assure proper self-alignment between the cover and hub and a positive and effective sealing action between the mating surfaces, one of which surfaces, in the preferred embodiment, being provided with a special form of groove for receiving and effectively retaining therein an elastic O-ring or other suitable type sealing gasket.

In accordance with another feature of the invention, the closure device in its preferred form is fabricated by an improved method which includes obtaining the dished cover and mounting hub parts from a single cap, dished head or other structure of proper configuration as hereinafter described (sometimes for brevity hereinafter inclusively referred to simply as a cap) by severing the cap in such annular region thereof and in such manner as to provide in a single operation the hub part and the cover part of proper form and having the required complementary mating bevel surfaces above mentioned.

Other objects and the details of the invention will become apparent from the ensuing description taken in conjunction with the accompanying drawing in which FIG. 1 illustrates a form of cap employable as a blank to provide the cover part and hub part in accordance with a preferred aspect of the invention;

FIG. 2 shows the cover part and hub part in separated position after severance of the cap of FIG. 1;

FIG. 3 is a plan view of a completely assembled closure device according to a preferred embodiment of the invention;

FIG. 4 is an elevational view of the device of FIG. 3;

FIG. 5 is a detail view of a typical section through a portion of said device; and FIG. 6 is an enlarged section showing more in detail the form of the groove illustrated in FIG. 5.

Referring first to FIGS. 3–6, it will be seen that the principal parts of the closure device are a dished head or cover 1 and a cylindrical mounting hub 2 therefor. The hub is adapted at its lower or open end to be joined to a pipe end or to the wall of a tank, vessel or other enclosure for fluids in surrounding relation to an opening thereon. Desirably this is accomplished by welding, and accordingly the lower end of the hub is shown as being provided with a welding bevel 20.

Cover 1 is mounted on hub 2 so as to be movable relative to the hub to and from the hub closing position illustrated in FIG. 4. Such mounting may be accomplished in any suitable manner, but preferably, for reasons that will be pointed out, the mounting means should be of a kind that will control the movement of the cover so as to assure at all times a predetermined positional relationship between the cover and hub when the former is in its closing position. In the illustrated embodiment, such mounting is accomplished by hinge means comprising a pair of spaced apart hinge brackets 4 attached by welds 22 (FIG. 3) to hub 2, and a hinge tube 3 attached by welding, as indicated at 21, to cover 1. The hinge tube is rotatably mounted on a hinge bolt 6 which is threaded through hinge brackets 4 and locked in place by lockwasher 7 and nut 8. Desirably, a bushing 5 of the self-lubricating type is inserted into hinge tube 3 prior to threading bolt 6 into brackets 4 in the assembly of the hinge parts. With such hinge mounting, cover 1 may be swung, as indicated by the curved broken line in FIG. 4, to an open position, indicated by the straight broken line in that figure. In those cases where the closure device is mounted with its axis extending vertically, it is desirable that the cover be swingable beyond its vertical position into engagement with a stop such as afforded by the surfaces 4a of the hinge brackets. To aid in manipulation of the cover, there may be provided a handle such as that indicated at 19 and which is secured to the cover 1 by welds as indicated at 23.

From FIG. 5, it will be seen that the lower end of cover 1 and the upper end of hub 2, as viewed in the drawing, are provided with beveled edges 1a and 2a, respectively, which afford complementary mating surfaces inclined at an acute angle, preferably in the order of 45°, to the center line of the closure device. As will be set forth more in detail in later description in connection with FIGS. 1 and 2, the mating surfaces coincide with a frustum of a cone, an element of which is indicated by the broken line X in FIG. 1 and the apex of which lies on the center line Y of the cap illustrated in FIG. 1, which center line corresponds also to the center line of the closure device as will be pointed out. The referenced cone may lie on either side of the area of parting between the cover and hub. That is, it may extend upwardly from that area, in which case the mating surfaces 1a and 2a will be inclined downwardly in an outward direction as viewed in FIG. 5. However, in the preferred embodiment as illustrated, the referenced cone extends downwardly, i.e., it lies at least partially within the hub part, so that the mating surfaces are inclined downwardly in an inward direction and the mating surface 1a of the cover faces generally outwardly in a direction away from the center line of the closure device as viewed in FIG. 5. With inclined mating surfaces such as afforded by the beveled edges of the cover and hub, as above described, there is obtained in the closing of the cover a positive self-aligning action which assures proper engagement of the cover with the seat afforded by the beveled edge of the hub for most effective sealing action between the two parts. In actual practice, it has been found that when the mating surfaces are machined to a smooth finish of, say, 63–125 microinches, a closure device constructed in accordance with the present invention is capable of providing an effective seal under relatively high pressures, in the order of 350 p.s.i.

Such machining of the mating surfaces, however, is relatively costly, and it therefore is expedient to employ a sealing gasket to accomplish effective sealing action with relatively unfinished surfaces such as result from a simple cutting operation as hereinafter described. Hence, in the illustrated embodiment, there is machined in the mating surface of the cover, which is the one that faces generally outwardly in that embodiment, a groove for receiving a sealing gasket. Although various types of gaskets may be employed, it has been found particularly effective to use an O-ring type of gasket made of rubber or other suitable elastic material. To this end, the annular groove 18 in the mating surface of cover 1 is made of special configuration, best seen in FIG. 6, to accommodate such O-ring, indicated at 17. In particular, the depth of the groove is made slightly less than the diameter of an uncompressed O-ring of the predetermined size required, and the width of the groove is made slightly greater than that diameter to afford space for spreading out of the O-ring under compression. Also, it will be noted that the side walls of the groove extend generally perpendicular to the bevel surface 1a and the inner one, 18a, of the side walls has a concave contour, curved to correspond approximately to the cross-sectional radius of the O-ring. This curvature of the inner wall of the groove, in conjunction with the inclination of that wall with respect to the center line of the closure device, makes it necessary to stretch the O-ring slightly to get it into the groove, and then assures effective retention of the O-ring in the groove during opening and closing of the cover.

Although any suitable form of quick-releasable fastening means may be employed for securing the cover in its closing position and exerting sealing pressure on the mating surfaces of the cover and hub, the swing-bolt type of fastening means is particularly advantageous because of its simplicity, low cost, ease of operation and effectiveness of securing and clamping action. Hence, in the preferred embodiment illustrated, such fastening means are employed and comprise cap screws 9 having at their free ends fixed bolt-type heads adapted to be engaged by a wrench or the like for turning the screws, and these screws at their other ends are threaded into trunnion rods 11 pivotally carried by trunnion tubes 12 which are welded to hub 2 as indicated at 14. Such trunnion rods may, for economy, be made of bar stock with holes drilled and tapped at mid-length to receive the cap screws. On cover 1, for engagement by the cap screws, there are provided lugs 13 of U-shaped form which are welded to the cover as indicated at 15. In final assembly, and before the cap screws are threaded to trunnions 11, washers 10 are slipped on the cap screws to provide adequate bearing on lugs 13. The cap screws, when in engagement with the lugs as shown in the drawing, may be screwed down so as to tightly hold the cover in closing position and to exert sealing pressure on the mating surfaces of the cover and hub. It is important that the cap screws, or swing bolts, be located at substantially equally spaced intervals around the closure device so as to equalize the pressure. Varying number or sizes or both, of swing bolts may be employed depending upon the total pressure for which the closure device is designed. A single closure device often may be adapted for various pressures simply by varying the number of swing bolts employed.

As an important safety feature, lugs 13 are attached to the curved surface of the cover in such manner that their outer extremities tilt upwardly at an angle, preferably in the order of 10° to 15°, so that it is necessary to back off the cap screws 9 a turn or two before they can be released from engagement with lugs 13. This enables the cover to open slightly if there is residual pressure in the associated enclosure so that the pressure may be bled off, or in any event a warning is given by escape of fluid, before an operator completely releases the cover. A further advantage of the described swing bolt arrangement is that by reason of the threading of the lower ends of caps screws 9 into the trunnions 11, there is avoided the possibility of dropping or misplacing nuts or washers when the cover is open, such as may occur with pivoted eye-bolt types of fastening means having threaded nuts on the free ends of the bolts. Also, the illustrated arrangement protects the cap screw threads from corrosive action of fluids escaping from the closure device and even makes it possible to apply boots or other protective coverings to minimize rusting and binding of the cap screw threads.

In the preferred embodiment of the invention the cover 1 and hub 2 are obtained from a single element which may be of simple construction and of a type readily available. For example, the cover and hub parts may be made from a semi-ellipsoidal cap to ASA (American Standards Association) specifications in sizes up to 24" and from flanged-and-dished heads conforming to ASME (American Society of Mechanical Engineers) Boiler Code requirements in larger sizes. Also, there may be employed as starting blanks other suitable forms of hollow dished elements having a concavo-convex portion, which may be of spherical, ellipsoidal, semi-ellipsoidal or other similar contour, and a cylindrical flange or skirt portion extending axially from the dished portion. Such hollow dished elements are for brevity referred to inclusively herein as caps.

In the illustrated construction, for example, there is employed a cap of semi-ellipsoidal form as illustrated at B in FIG. 1. Such a cap usually is available with a welding bevel, such as indicated at 20 in FIG. 4, already applied to its open end. In fabrication of a closure device in accordance with the method of the present invention, the cap is severed into two parts, as shown in FIG. 2, by cutting the cap in an annular region, indicated at C, extending around the cap intermediate its open and closed ends. It is desirable, particularly with caps having relatively short cylindrical flange or skirt portions, to effect the cut in the region coinciding substantiallly with the knuckle where the curved contour of the dished portion becomes tangent to the cylindrical skirt portion. As an important feature of the invention, the cut 16 is inclined at an acute angle, preferably in the order of 45°, to the center line, indicated at Y, of the cap. Thus, in the severing operation there are automatically provided the desired bevels on the cover part 1 and the hub part 2 which afford the complementary mating surfaces 1a and 2a previously mentioned. These surfaces, as stated, coincide with a frustum of a cone having its apex lying on the center line of the cap. Such referenced cone may lie on either side of the parting region, but in the illustrated embodiment the cut is so made that the referenced cone lies at least partially within the hub part. In this case, as illustrated, the mating bevel surface 1a of the cover part faces in a generally outward direction away from the center line and the mating bevel surface 2a of the hub part faces in a generally inward direction.

Due to the complementary bevel surfaces on the cover and hub, less precision in the construction and dimensions of the hinge assembly is required since the cap is self-centering on the hub by virtue of the angular disposition of the mating surfaces. However, particularly in those cases where the original cap blank has irregularities in contour, as often may be true, it is important that in the assembly operation the cover and hub parts be held in substantially the same positional relationship with respect to each other as they occupied in the original unsevered blank. Then in securing the parts together, as by a hinge arrangement such as illustrated, the mounting means should be affixed to the parts, and should be constructed and located, so as to maintain the original positional relationship when the cover is in closing position. Thus, any irregularities in the cover and hub parts which carry over from the original blank are complementary in the final assembly, with the result that obtaining effective sealing engagement of the mating surfaces is greatly facilitated.

Among the advantages of the invention is that it makes possible the provision of a unitary quick-opening closure device which has superior sealing capabilities, particularly as compared to conventional blind flange arrangements, since the dished contour of the cover, for a given thickness, has greater pressure resisting ability than a blind flange or other device employing a flat plate closure. Further, by virtue of the simple and economical nature of all of the component parts and their arrangement in the final assembly, and particularly the manner in which the cover and hub parts are obtained in the preferred embodiment, closure devices of the present invention may be made of minimum weight and at low cost, frequently of less weight and at lower cost than blind flange type closures of comparable ratings. This is particularly true when the weight and cost of the bolts required in blind flange installations are taken into consideration. Also, a closure device of the present invention, which requires no loose bolts, eliminates the danger of losing or misplacing, as well as the nuisance of handling, the bolts such as are required for blind flanges.

As compared with quick-opening closures of the types heretofore available, the closure devices of the present invention generally are considerably more economical so that they may be utilized to obtain the advantages of quick opening in situations where the use of previous types of quick-opening devices would not be justifiable.

What is claimed is:
1. A unitary quick-opening closure device adapted to be mounted in closing relation to an opening in an enclosure for fluids, which device comprises:
 (a) a cylindrical mounting hub adapted to be joined at one end to such enclosure around an opening therein, and the other end of which hub has a beveled edge adapted to provide a cover seat;
 (b) a dished cover of concavo-convex contour having a beveled edge complementary to and adapted to mate with the seat provided by said beveled edge of the hub;
 (c) cooperative mounting means affixed to said hub and cover and operative to support the cover on the hub for controlled movement of the cover relative to the hub to and from a closing position wherein said complementary beveled edges of the cover and hub are in mating relationship with each other; and
 (d) quick-releasable fastening means operable to secure said cover in its said closing position and to exert sealing pressure on the joint between said complementary beveled edges;
 (e) the mating surfaces afforded by said complementary beveled edges of the hub and cover coinciding with a frustum of a cone having its apex on the center line of the closure device, and the one of said mating surfaces which faces generally outwardly away from said center line having formed therein an annular groove for receiving a sealing gasket, the side walls of which groove extend generally perpendicular to said mating surface and are spaced apart a distance slightly greater than the depth of the groove, and the inner one of which side walls has a concave contour so as more effectively to retain a sealing gasket in the groove.

2. A closure device according to claim 1, wherein the one of said mating surfaces which faces generally outwardly and has a sealing gasket receiving groove therein is on the beveled edge of said cover.

3. A unitary quick-opening closure device adapted to be mounted in closing relation to an opening in an enclosure for fluids, which device comprises:
 (a) a cylindrical mounting hub adapted to be joined at one end to such enclosure around an opening therein, and the other end of which hub has a beveled edge adapted to provide a cover seat;
 (b) a dished cover of concavo-convex contour having a beveled edge complementary to and adapted to mate with the seat provided by said beveled edge of the hub;
 (c) cooperative mounting means affixed to said hub and cover and operative to support the cover on the hub for controlled movement of the cover relative to the hub to and from a closing position wherein said complementary beveled edges of the cover and hub are in mating relationship with each other; and
 (d) quick-releasable fastening means operable to secure said cover in its said closing position and to exert sealing pressure on the joint between said complementary beveled edges;
 (e) said cover and hub comprising parts obtained from a single closure cap of substantial wall thickness having a dished portion of concavo-convex contour and an integral cylindrical skirt portion, which cap has been severed into two parts by cutting it in an annular region intermediate its open and closed ends to provide the dished cover part and the cylindrical hub part, respectively, with the cut inclined at an acute angle to the center line of the cap so as thereby to provide said complementary beveled edges on said cover and hub.

4. A closure device according to claim 3, wherein the said mounting means which support the cover on the hub are constructed and located so as to maintain the cover, when in said closing position, in substantially the same positional relationship with respect to the hub as in the original unsevered cap.

5. A closure device according to claim 4, wherein the said mounting means comprises cooperating hinge elements for swingably supporting said cover, which elements are affixed respectively to said cover and to said hub at such locations, and are so constructed, as to establish and maintain said positioned relationship between the cover and hub.

6. A closure device according to claim 3, wherein the annular region occupied by said complementary beveled edges of the cover and hub, when the cover is in closed position, is located substantially at the knuckle where the curved contour of the cover becomes tangent to the cylindrical contour of the hub.

7. A closure device according to claim 3, wherein the mating surfaces afforded by said complementary beveled edges of the hub and cover coincide with a frustum of a cone having its apex on the center line of the closure device, and the one of said mating surfaces which faces generally outwardly away from said center line has formed therein an annular groove for receiving a sealing gasket, the side walls of which groove extend generally perpendicular to said mating surface and are spaced apart a distance slightly greater than the depth of the groove, and the inner one of which side walls has a concave contour so as more effectively to retain a sealing gasket in the groove.

References Cited by the Examiner
UNITED STATES PATENTS

| | | | |
|---|---|---|---|
| 2,292,669 | 8/42 | Sinclair et al. | 29—414 |
| 2,386,246 | 10/45 | Mapes | 29—414 |
| 2,404,468 | 7/46 | Volkes et al. | 220—55 |
| 2,751,108 | 6/56 | Getz | 220—46 X |
| 3,007,595 | 11/61 | Remley | 220—4 |
| 3,029,724 | 4/62 | Lee | 220—46 |
| 3,032,228 | 5/62 | Andrews | 220—4 |

FOREIGN PATENTS 224,824 10/59 Australia.

THERON E. CONDON, *Primary Examiner.*